Nov. 16, 1948.   C. CHISHOLM   2,453,781
RECORD CONTROLLED OPERATING MECHANISM
FOR EMBOSSING MACHINE KEYBOARDS
Filed June 14, 1946   9 Sheets-Sheet 6
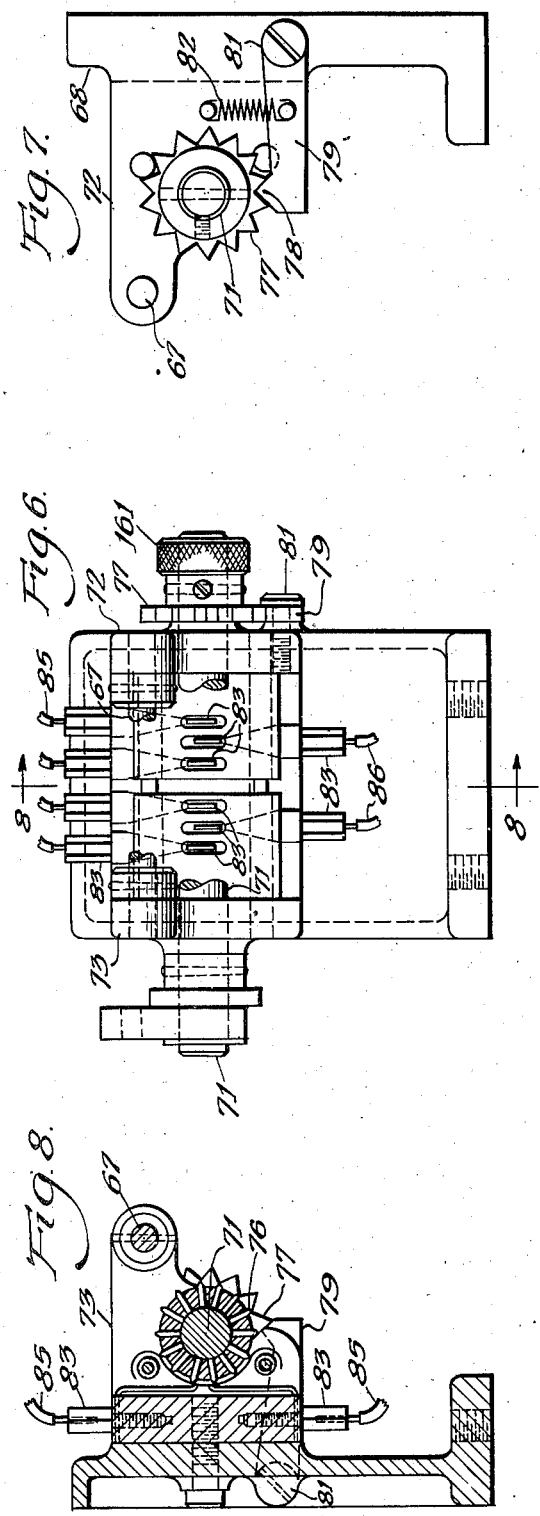
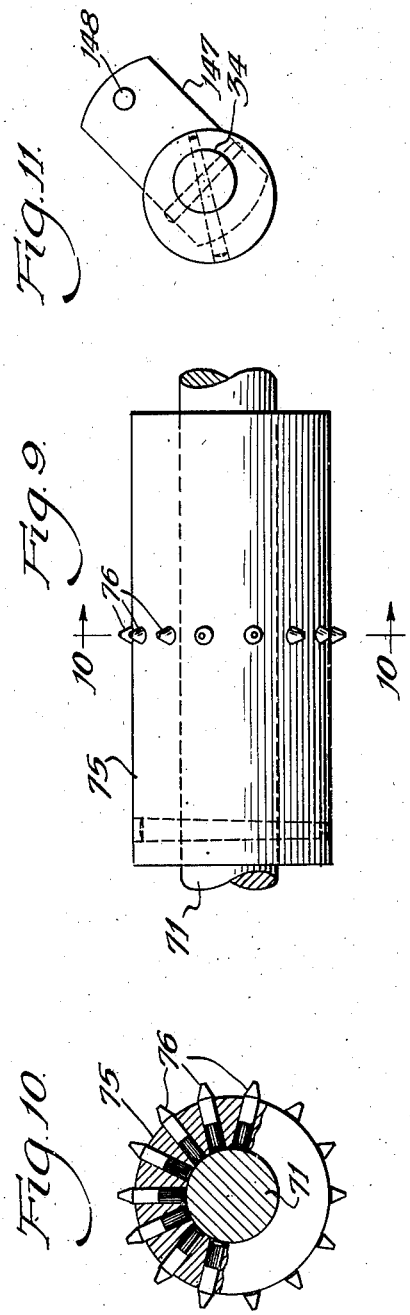

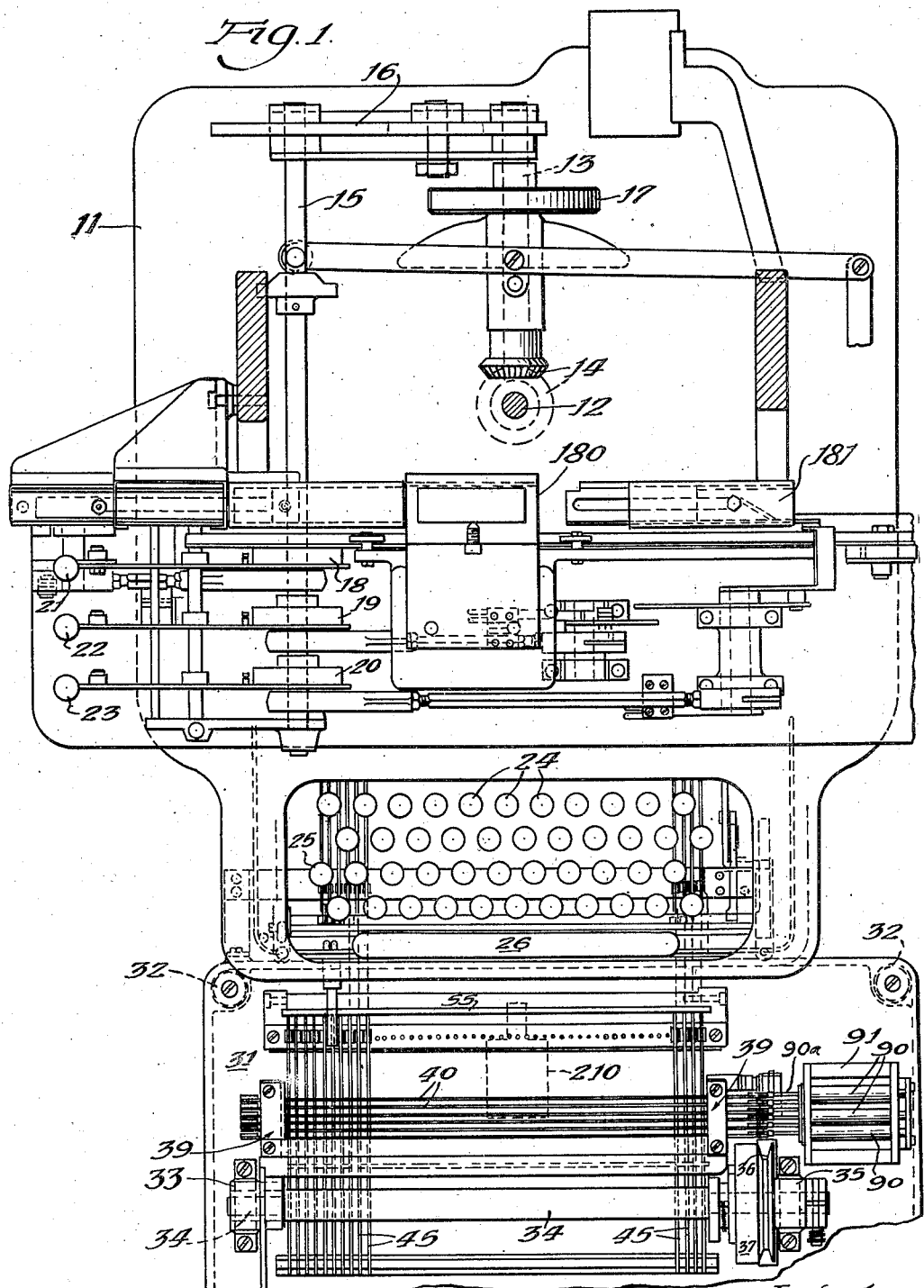

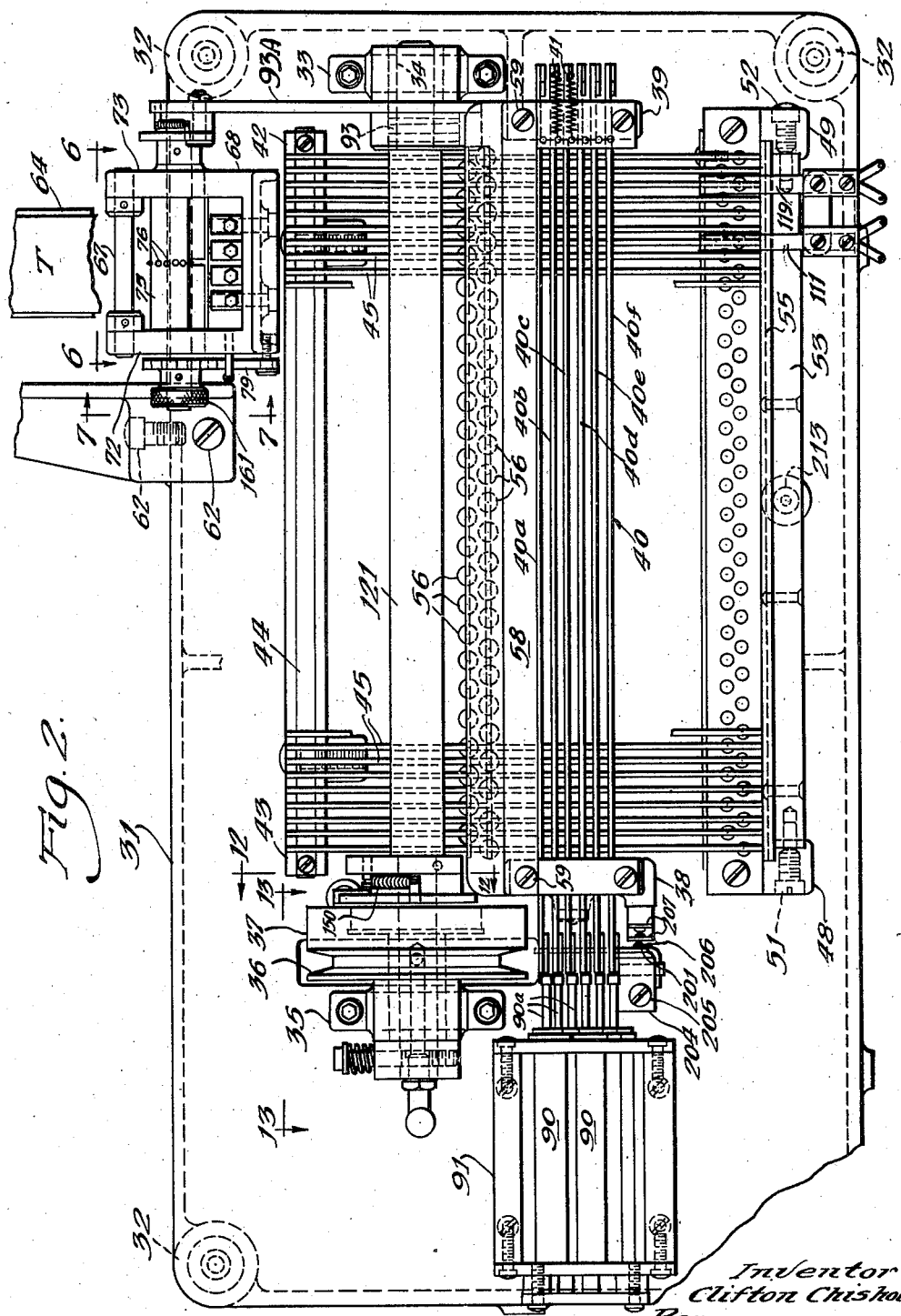

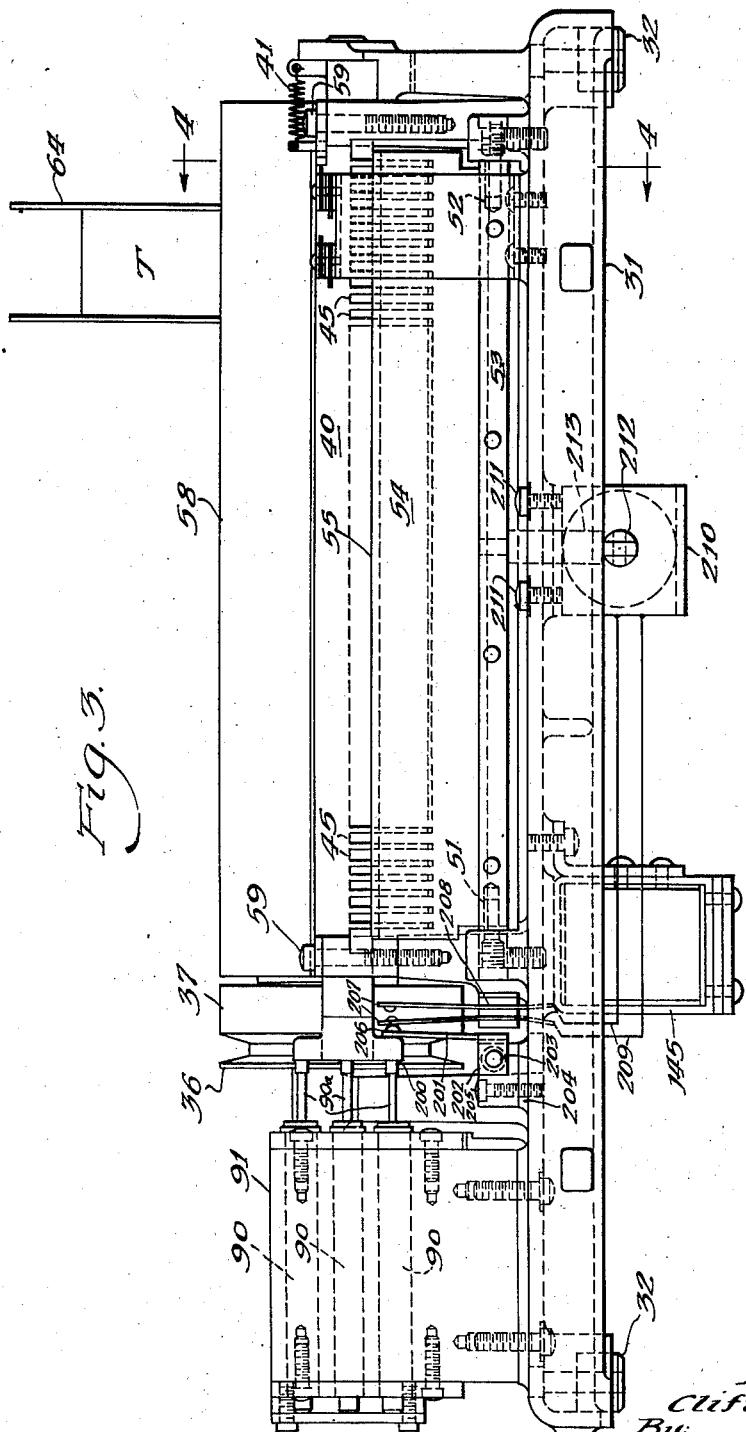

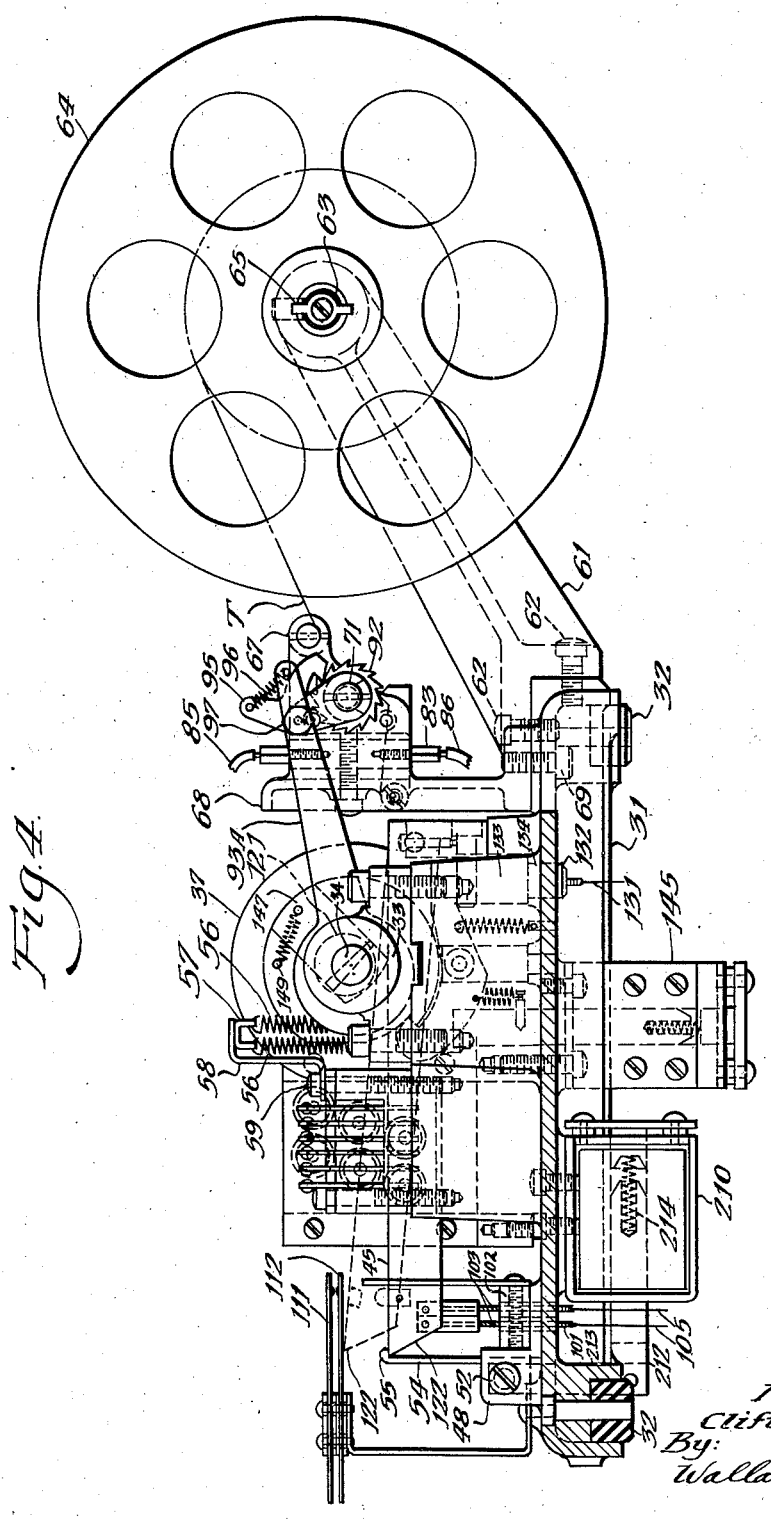

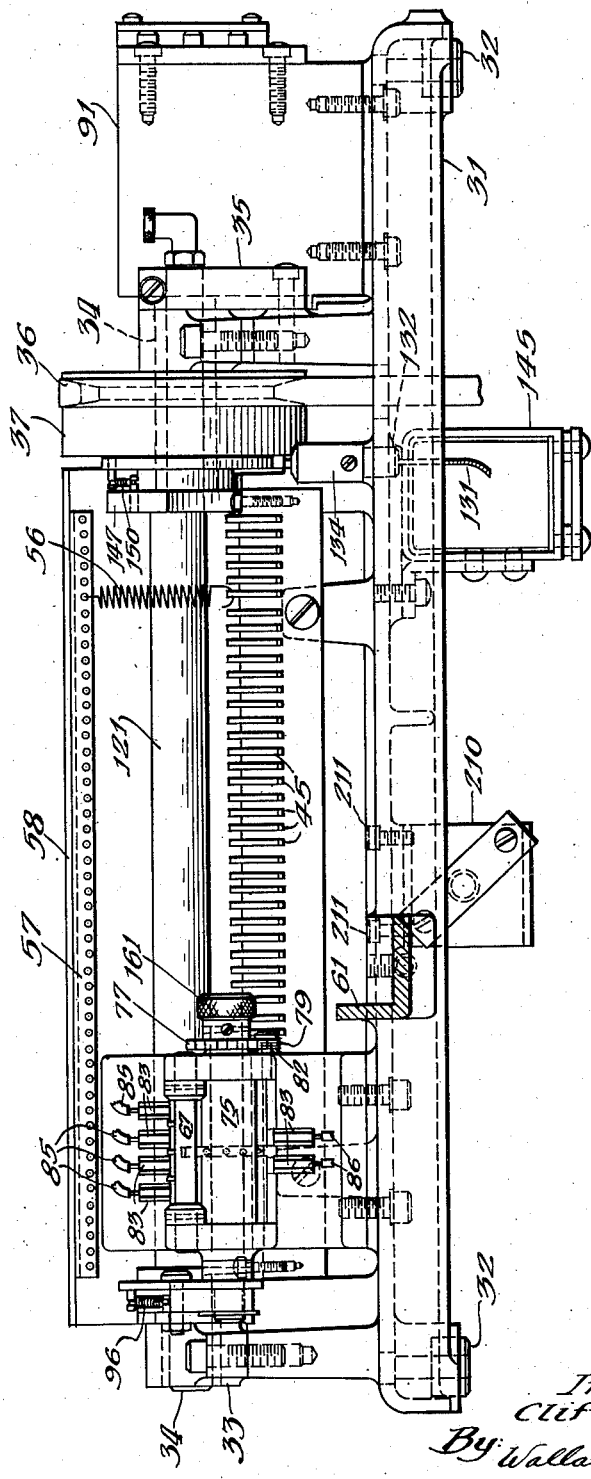

Nov. 16, 1948.   C. CHISHOLM   2,453,781
RECORD CONTROLLED OPERATING MECHANISM
FOR EMBOSSING MACHINE KEYBOARDS
Filed June 14, 1946   9 Sheets-Sheet 7
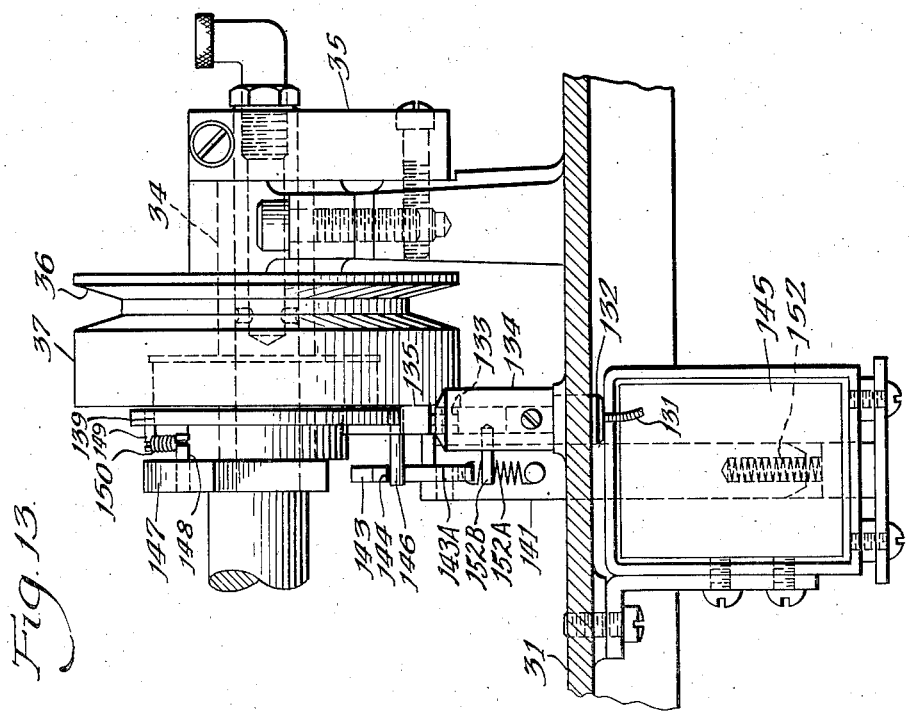
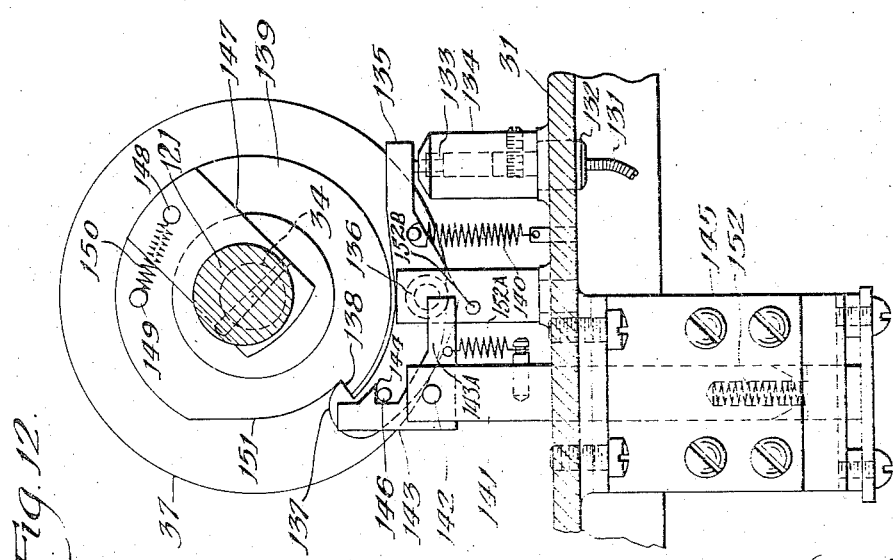
Inventor:
Clifton Chisholm
By Wallace and Cannon
Attorneys Nov. 16, 1948.　　　　　C. CHISHOLM　　　　　2,453,781
RECORD CONTROLLED OPERATING MECHANISM
FOR EMBOSSING MACHINE KEYBOARDS
Filed June 14, 1946　　　　　　　　　　　　9 Sheets-Sheet 9

Inventor:
Clifton Chisholm
By Wallace and Cannon
Attorneys

Patented Nov. 16, 1948

2,453,781

UNITED STATES PATENT OFFICE 2,453,781

RECORD CONTROLLED OPERATING MECHANISM FOR EMBOSSING MACHINE KEYBOARDS

Clifton Chisholm, Forest Hills, N. Y., assignor to Addressograph-Multigraph Corporation, Cleveland, Ohio, a corporation of Delaware Application June 14, 1946, Serial No. 676,778

3 Claims. (Cl. 197—20)

1

This invention relates to an embossing machine and especially to an embossing machine of the character designed for embossing sheet metal printing plates and the like with printing characters under the control of a manual keyboard. The invention pertains particularly to mechanism for automatically operating the keyboard and other control elements of an embossing machine by control of a record member such as a perforated tape.

In my copending application Serial No. 676,779, filed June 14, 1946, there is disclosed a machine for perforating a tape by providing therein, perforations arranged according to a predetermined code. In the application mentioned, the perforating mechanism is controlled by the keyboard of a standard typewriter, a particular perforation, or combination of perforations being provided for each character key or other control mechanism of the standard typewriter keyboard. Since embossing printing plates involves certain operations for which the keyboard of a standard typewriter has no comparable function, additional control means are provided for perforating other code combinations into such tape in addition to those which are perforated under the control of the typewriter keyboard. A tape which is provided with the code perforations in the mechanism just referred to is preferably employed with the present invention as a control record member.

In another copending application by John H. Gruver, Serial No. 676,780, filed June 14, 1946, an embossing machine of the general character mentioned above is described which is particularly adapted to be controlled by the mechanism of the present invention. The embossing machine described in the aforesaid Gruver application is equipped with a manual keyboard which is substantially identical with that of a standard typewriter, and is provided with additional controls for performing certain other functions such as feeding a plate to be embossed into a carriage therefor, advancing the carriage to embossing position, tabulating, returning the carriage, line spacing, and ejecting a finished plate preparatory to a new operation. The machine described in the aforesaid Gruver application includes means for shifting from lower case to upper case as in a standard typewriter and the tape which is perforated by mechanism described in my co-pending application referred to above, is particularly well suited for controlling the operations of the machine described in the aforesaid Gruver application.

2

Hence the present invention includes means for reading the code data carried by a tape perforated in a machine of the general character described in my aforesaid co-pending application and for translating such reading into mechanical operation as for selectively operating the manual keyboard and other controls of an embossing machine of the character mentioned above and described in the aforesaid co-pending application filed by Gruver.

Although all of the machines referred to above, including that involved in the present invention, may be used for various and analogous purposes, and for producing articles other than embossed printing plates, they are particularly adapted for producing printing plates, such as address plates and the like, which may be fed in series through a printing machine for printing changeable data upon articles such as business instruments, envelopes, periodicals, and the like.

A particular application of the present invention has to do with the addressing of periodicals which are issued in large quantity. For example, some of the more popular magazines have a regular circulation which runs into many thousands, and in some cases into millions. Normally, such magazines are addressed by automatic machinery and a printing device such as an embossed plate or the like is provided for each of the subscribers. There are frequent changes in names and/or addresses however, and at certain seasons, particularly at the end of the calendar year, mass expirations and new subscriptions require the revision or production of vast quantities of individual printing devices. Hence there is a need for automatic mechanism which can reduce peak work loads of this character, or permit them to be handled more efficiently.

The preparation of quantities of printing plates required to meet the needs described above is a particularly large task when it involves their embossing since embossing machines by their nature are somewhat slow and ponderous in operation. Although as noted above, such machines may be operated under the control of manual keyboards similar to those of a standard typewriter, they are not capable of as rapid operation as a typewriter and the production of required quantities of new printing plates such as address plates constitutes a serious bottleneck in commercial organizations where seasonal peak loads are high as in the instances mentioned above. Hence the use of automatic mechanism for operating embossing machines of the aforesaid character permits substantially continuous operation thereof during night and day without requiring large temporary increases in personnel and without limiting production to the capabilities of the relatively few available machine operators.

As pointed out in my aforesaid copending application, tape may be perforated under the control of a standard typewriter keyboard much more rapidly than plates can be embossed under manual control because a typewriter can be operated manually much more rapidly than an embossing machine. Hence the combination of a perforated tape so produced and means such as comprise my present invention for operating an embossing machine under the control of such tape is of material assistance to those organizations having seasonal peak work loads of the character aforesaid.

Inasmuch as embossing machines as previously noted are somewhat slow in operation as compared to typewriting machines, it is necessary that automatic operation thereof be limited in speed to the capabilities of the embossing machine, but such speed, being regular, is considerably greater on the average than can be attained manually since the embossing machine can be run substantially at maximum and sustained speed for long periods without interruption.

It is therefore an object of my invention to operate the manual keyboard of an embossing machine of the aforesaid character by simple tape control mechanism which controls all necessary manual operating elements of such embossing machine.

Another object of my invention is to control functions other than those which can be controlled by the usual manual keyboard by providing means under the control of code elements in a record member, such as a perforated tape, for intiating such additional functions. Such functions may include the feeding of a plate to be embossed into a carriage therefor, moving the carriage automatically into working relation with respect to the embossing mechanism, returning, tabulating and line spacing the carriage to present a desired element of a plate carried thereby in proper relation with respect to the embossing dies, and ejecting a finished plate and processing it through finishing means such as rollers, which smooth its surface and render it suitable for use in printing machines.

Other objects of my invention are to accomplish the foregoing without interfering with manual operation of an embossing machine keyboard, should it be desirable at times to interrupt automatic operations, to assemble necessary operating elements with the embossing machine in such a manner that they may be readily detached when desired, and to accomplish the foregoing with relatively simple mechanical means.

A further object of my invention is to arrange and operate a simple group of code bars under the control of a record member, such as a perforated tape, so as to selectively operate desired elements of the embossing machine keyboard under the control of such selected code bars. A still further object is to operate a keyboard having a relatively large number of operating elements by a simple arrangement of relatively few code bars combined in various ways to select any of said keyboard elements.

An additional object of my invention is to control the advancing of a record member, such as a perforated tape, through operating means for an embossing machine as aforesaid in such a manner that such record member may be fed to present a new element thereof to sensing mechanism to initiate a new operation only after a prior operation of the embossing machine has been accomplished, thereby avoiding damage to the embossing machine.

Other objects of my invention are to translate matter contained in code on a paper strip or the like into impulses which may be utilized to cause a keyboard operated machine to perform its functions as may be required to produce work automatically which heretofore has been accomplished by manual control; more specifically, objects are to produce completely embossed printing plates suitable for use in selective printing machines without manual operation of such embossing machine, and to accomplish the foregoing with a minimum of mechanical parts.

Other and further objects of the present invention will be apparent from the following description and claims and are illustrated in the accompanying drawings which, by way of illustration show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a plan view showing an embossing machine of the character to which my invention is particularly applicable, and showing in the lower part thereof the remote operating and control mechanism which comprises my invention;

Fig. 2 is a plan view on a larger scale of the remote operating and control mechanism shown in the lower part of Fig. 1, the position of such mechanism being reversed as compared with Fig. 1;

Fig. 3 is an elevation of the mechanism shown in Fig. 2, taken from the front of Fig. 2;

Fig. 4 is an elevation showing certain parts in section, taken substantially along the line 4—4, Fig. 3;

Fig. 5 is an elevation of the mechanism shown in Fig. 2, taken from the rear of said figure and certain parts being shown in section;

Fig. 6 is a detailed view of the sensing mechanism, this view being taken substantially on the line 6—6, Fig. 2;

Fig. 7 is an end view of the mechanism shown in Fig. 6, this view being taken substantially on the line 7—7, Fig. 2;

Fig. 8 is a sectional view taken substantially on the line 8—8, Fig. 6;

Fig. 9 is a detailed elevation of the roller which advances the perforated tape and supports it during sensing;

Fig. 10 is a sectional view of the roller shown in Fig. 9, taken substantially along the line 10—10, Fig. 9;

Fig. 11 is a detail view showing a part of a clutch means by which the operating shaft may be driven in cycles;

Fig. 12 is an end elevation of the clutch mechanism used in driving the mechanism of my invention, this view being taken substantially on the line 12—12, Fig. 2;

Fig. 13 is a detailed elevational view of the mechanism shown in Fig. 12 with certain parts shown in section, this view being taken substantially on the line 13—13, Fig. 2;

Figs. 14 and 15 are juxtaposed so that the relation between code perforations in the tape and the operation of code bars may be more clearly set forth;

Figures 14, 15:
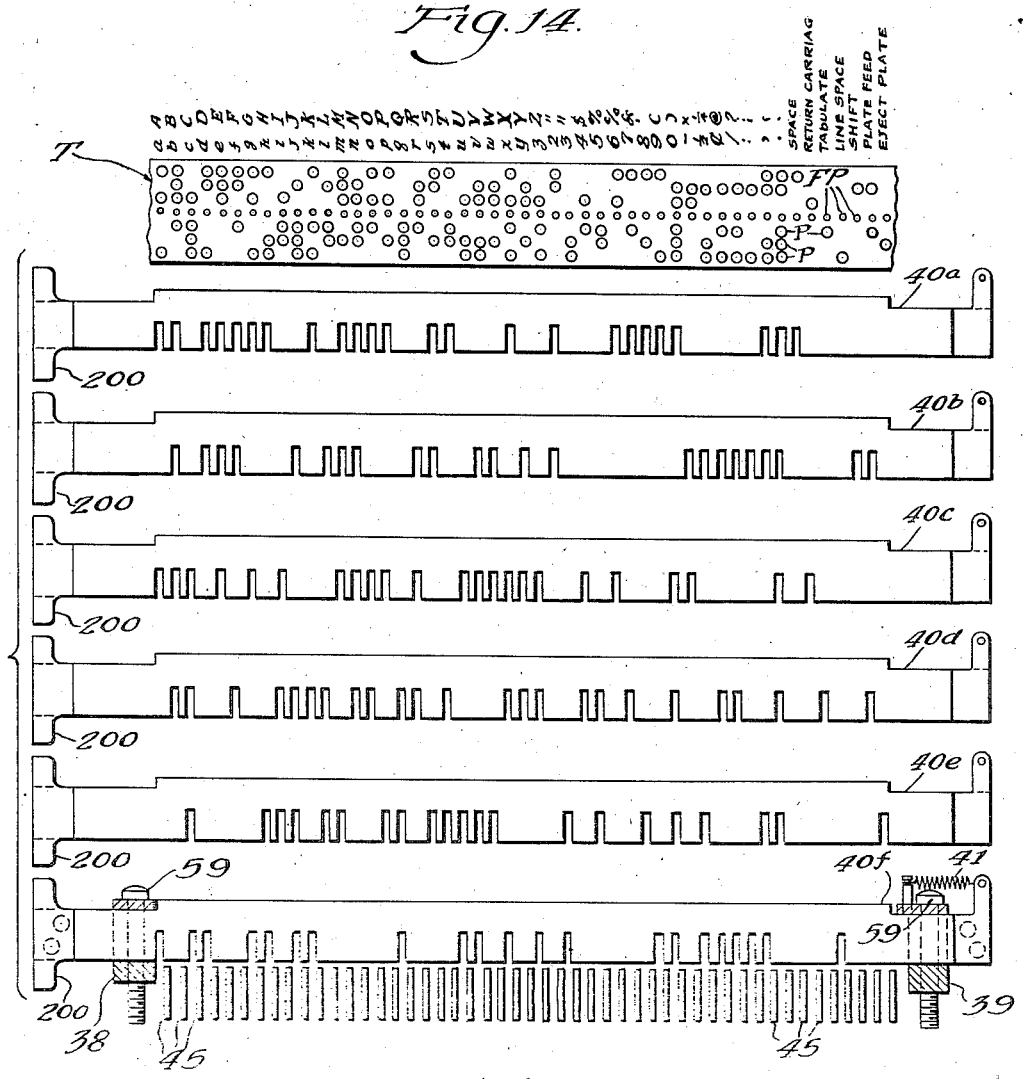
Fig. 14 shows a section of the perforated tape which controls the mechanism shown in Fig. 1, 2, and 13 inclusive, the code designations being indicated alongside the tape.
Fig. 15 is a disassembled view showing diagrammatically the arrangement by which a group of code bars may be utilized selectively to operate selected elements of the manual keyboard of an embossing machine.

Referring first to Fig. 1, the upper part of such figure shows somewhat diagrammatically an embossing machine of the general character described in the patent to Duncan No. 1,518,904 patented December 9, 1924. Certain operating mechanisms including the embossing dies are omitted but, as shown the embossing machine comprises a base or frame 11, a centrally located operating shaft 12 which carries the embossing dies, not shown, a rearwardly extending shaft 13 which drives the shaft 12 through bevel gearing 14, and another shaft 15 mounted parallel to the shaft 13 and extending forwardly of the machine. The shaft 15 may be driven from shaft 13 by any suitable mechanism such as the gearing indicated generally at 16. The shaft 13 and the other shafts which are driven thereby may be driven from any suitable source of power as through a drive wheel 17 mounted thereon.

The forwardly extending shaft 15 preferably carries certain operating mechanisms 18, 19, and 20 near its forward end which may be utilized in the manner described in detail in the aforesaid co-pending application of John H. Gruver to control various functions peculiar to an automatic embossing machine. Such operations may comprise feeding a plate into a carriage, retracting and line spacing such carriage, and ejecting a finished plate therefrom. These functions may be performed under the control of levers 21, 22, and 23 each of which may be manually operable, each being automatically operable also by certain elements disclosed in more detail hereinbelow and forming a part of my invention.

The operating and control means which comprise the present invention are preferably mounted forwardly and somewhat below the manual keyboard of the embossing machine. As shown, the keyboard comprises keys 24 for selecting embossing characters and other manual keys such as a shift key 25, and a space bar 26 which are substantially identical with corresponding elements on a standard typewriter as will be more fully described hereinafter. The mechanism which forms my present invention may be connected to the various control keys described above through means such as Bowden cables by which such keys are operated.

The machine which forms my invention contains structure for remotely controlling all the operations of an embossing machine of the character specified. It includes a base frame member 31 which may be supported in any suitable manner, as by the cushioned feet or supports 32, which may be mounted in turn upon a suitable frame or support carried either by the embossing machine or by the floor in front of and below the embossing machine. Bowden cables of appropriate length are connected from the mechanism mounted on base 31 to the elements of the keyboard on the embossing machine and since these are flexible, the position of the base 31 may be varied as desired.

As shown in greater detail in Fig. 2, the frame 31 may be a substantially rectangular plate supported at its four corners by supporting studs 32, which may be rubber cushions or the like, one being shown near each end of the base or frame member 31. It will be noted that the position of the remote control mechanism as shown in Fig. 2 is reversed as compared with Fig. 1, but since all connections between the embossing machine and the remote control mechanism are established through flexible means such as Bowden cables, the relative positions are unimportant.

A bearing bracket 33 is provided for supporting the main operating shaft 34 at its right end as seen in Fig. 2. Toward the left end in the same figure a similar bearing bracket 35 supports the opposite end of the shaft, a belt pulley 36, and a clutch mechanism 37, to be described in greater detail hereinafter being mounted on this end of the shaft.

In front of the shaft as seen in Fig. 2, and in front of the bearings just described, are another pair of brackets shown at 38 and 39 in which six code bars designated 40 collectively, are slidably mounted. At their right ends, each of these bars has a tension spring 41 attached, such spring tending to pull the bars to the left as seen in Fig. 2. See also Fig. 15.

Behind the shaft 34 are two vertical brackets 42 and 43 which support a horizontal rod 44 upon which the rear ends of a number of parallel bars or levers 45 are pivoted. These bars are designed to operate all the controls of an embossing machine and there are as many of them as there are elements on the keyboard of the machine to be operated, plus a sufficient number to operate certain other mechanisms as will be more fully described below.

Near its front end as seen in Fig. 2 or rear end as seen in Fig. 1, the base 31 is provided with a pair of spaced brackets or lugs 48 and 49 each of which is threaded and counterbored to receive a pivot screw 51 or 52. A bar 53 is bored at either end to pivot on the pivot screws just mentioned, and it carries an upstanding plate 54, the upper edge of which is bent over to form a latching member 55 as shown in Fig. 4. The latch member 55 normally holds an end of each of the bars down, all the bars being aligned in a substantially horizontal plane and each bar extending approximately horizontally from its pivoted rear end to such latch. By means which will be described presently, the latch member 55 may be rocked forward or to the left as shown in Fig. 4, to release all of the bars 45. When this occurs, such a bar 45 as is aligned suitably with notches in a code bar 40 will be released to move upwardly under the influence of a spring 56 to the dotted line position shown in Fig. 4. Each bar 45 is provided with a spring 56, the upper end of each spring being attached to a channel bar 57 which is supported by a plate 58 having its lower horizontal foot portion secured by a bolt or screw 59 to the brackets 38 and 39 which serve to guide the code bars for longitudinal movement as previously described. On one edge of the base plate or frame member 31 at the front as seen in Fig. 1 or the rear as seen in Fig. 2, a reel bracket 61 is mounted, being attached by suitable fastening means such as the screws 62. This bracket extends upwardly and rearwardly, as seen in Fig. 2, from the base 31 and at its rear end it mounts a suitable spindle 63 for securing a reel 64 on which a control tape T may be wound. A suitable quick-release device may be provided to retain the reel on the spindle, such a device being indicated at 65.

A supply of perforated tape, preferably of the type produced in the mechanism of the aforesaid co-pending application Serial No. 676,779, is wound on the reel 64 so as to be unwound in the same order in which it was perforated. As shown in Fig. 14, this tape is of the six code type, that is, provision is made for six rows of perforations. One or more perforations may be punched in horizontal alignment at any position on the tape. An additional or seventh row of perforations extends along the center line of the tape but performs no control function, this row of perforations being intended for cooperation with feed mechanism to insure correct step by step feeding of the tape so that the control perforations will be properly positioned with respect to sensing mechanism to be described hereinafter.

The tape T is led from the supply reel 64 under a guide roller 67 mounted in the upper part of an auxiliary frame member 68. The frame member 68 is rigidly secured to the base 31 by appropriate fastening means such as the bolt or screw 69. From the guide roller 67 the tape is led to step by step or intermittent feeding mechanism which will next be described.

Referring now to Figs. 6 to 10, a feed roller shaft 71 is mounted in the auxiliary frame member 68 by bracket flanges extending from each end thereof and transverse to base 31 in parallel relation to each other. These bracket flanges or arms 72 and 73 provide suitable bearings for the shaft 71. Shaft 71 carries a feed roller 75 which is best shown in Figs. 9 and 10 as provided with a row of radial pins 76 suitably spaced and sized to fit the central or feed row of perforations in the tape T. These pins 76 are secured in the body of the roller 75 in an appropriate manner. Each pin 76 has a substantially conical portion protruding from the surface of the roller which is adapted to engage one of the central perforations FP in the tape T and cause positive and accurately controlled feeding thereof.

At its left end as seen in Fig. 2 or at the right, Figs. 1 and 5, and shaft 71 is provided with a toothed wheel 77 having notches therein which are engaged by the nose portion 78 of a locking pawl 79 pivotally attached to the frame member 68 as by a suitable screw or bolt 81. A spring 82 attached between the pawl 79 and the bracket 72 constantly urges the pawl to engagement with the notched wheel 77. The pawl nose closely fits the notches in the wheel 77, thus insuring that at each step the shaft 71 will be positively and accurately located so as to present a precise portion of the tape to electrical sensing contacts 83 which are disposed opposite the roller 75 as best shown in Figs. 6 and 8.

The electrical sensing means employed in the present invention for detecting the location of perforations in the tape T comprise the sensing contacts 83 which are preferably made of a material which will not be easily damaged by sparking such as occurs when contacts are broken. A suitable material is a beryllium-copper alloy or the like as well known in the art. As shown in Fig. 6, the first, third, fourth, and sixth contacts from left to right in said figure, are connected to conductors which extend upwardly as indicated at 85. The second and fifth contacts 83 are connected to conductors 86 which extend downwardly. All the conduits or conductors 85 and 86 extend to a suitable source of voltage, not shown. Inasmuch as the tape T is usually made of very thin material, standard lighting voltages may be found to be too great and a source of reduced voltage is preferably employed. Such a source may be any suitable battery or generator, 24 volts being a suitable potential.

In series with each of the conductors 85, 86 is a solenoid 90 which is mounted in a sub frame unit 91 near the left front of the machine as best shown in Fig. 2. The electrical connections are not shown in detail, being obvious, but one of the solenoids 90 is connected to each of the six code bars 40 previously described. The feed roller 75 is made of material which is a good electrical conductor, such as brass, copper, or the like, and a suitable conductor, not shown, leads from such roller to the other side of the electric supply voltage. Hence, when contact is made by one of the contact points 83, circuit is established from the supply line through the roller 75, contact 83 and conductor 85 or 86 to a solenoid 90 and thence to the other side of the voltage supply.

The tape T is fed intermittently by roller 75, this being accomplished by a suitable pawl and ratchet mechanism mounted at the right end of the feed roller as best shown in Fig. 4. The feed roller shaft 71 has a ratchet wheel 92 keyed thereto at its extreme right end as seen in Fig. 2. The main operating shaft 34 carries an eccentric 93 near its right end, as viewed in Figs. 2 and 3, and an arm 93A is mounted on such eccentric to be reciprocated as the shaft 34 revolves. Arm 93A extends rearwardly and upwardly above the ratchet wheel 92 and carries a pawl 95 which is urged toward the ratchet wheel by a tension spring 96. The pawl is pivoted on the arm at 97 and, as the arm reciprocates through a cycle of the shaft 34, the pawl engages a new tooth on the ratchet 92 and advances the feed roller one tooth. As will be seen by refering to Fig. 14, the control perforations P in the tape are spaced equi-distantly along the tape in line with feed perforations FP so that each time the tape is advanced one step, a new perforation or set of perforations P is presented to the contacts 83. Hence at each step of the feed mechanism just described, a code element of the tap selectively controls activation of one or more of the solenoids 90 so as to push an equal number of bars associated therewith to the right, as seen in Fig. 2, against the force of a spring or springs 41. The solenoid armatures 90a are so arranged that each opposes one of the bars 40.

Referring now to Fig. 15, it will be noted that the code bars 40 are each distinctively formed with notches in the lower edge thereof. By comparing Figs. 14 and 15, it will be noted that the bars 40 are shown arranged in the same order, from top to bottom in Fig. 15, as the code perforations P are arranged in rows in the tape shown in Fig. 14. Beginning at the top, Fig. 15, the code bars which are collectively indicated at 40 are individually designated 40a to 40f, respectively. The bar 40a is provided with a notch wherever the code in Fig. 14 requires a perforation in the first or upper row of the tape. Similarly, the second bar 40b is notched where perforations are required in the second row of the tape, and the third bar 40c is notched wherever the third row is perforated and so on. It will be understood that the notches in the code bars are not necessarily arranged in the same order, running from one end to the other, as shown, this being merely diagrammatic. To operate the "A" character key on the embossing machine, the bars 40a, 40c, and 40f must be moved since perforations are required in the first, third and sixth rows, Fig. 14. Likewise for the character "B," bars 40a, 40b, 40c, and 40d are notched in alignment and must all be moved for embossing this character.

Referring to Figs. 3 and 15, each of the bars 40a to 40f, inclusive, has a depending lug 200 at its left end as seen in these figures. The lugs 200 are all disposed opposite the upper end of a pivoted member comprising an upstanding plate 201 mounted on a block 202 which is pivotally supported at 203 in a bracket 204 secured by suitable means, such as a stud 205, to the base member 31. The plate 201 carries a button 206 of insulating material which is adapted to move a pair of upstanding electrical contacts 207 together when the plate 201 is moved clockwise as seen in Fig. 3. These contacts are suitably mounted in a block 208 of insulating material. Suitable conductors 209 lead from the contacts 207 to a solenoid 210 secured as by studs 211 to the bottom of the base member 31. Other conductors, not shown, complete a circuit from the solenoid to a suitable source of voltage when contacts 207 are closed.

The solenoid 210 has its plunger 212 pivotally connected to a depending arm 213 secured to the plate 54, the upper edge of which constitutes the latch member 55 for holding the levers 45 down. A spring 214 urges the plunger 212 to the left, as seen in Fig. 4, when the solenoid is not energized, thus holding the latch 55 in locking position.

When any one or more of the code bars 40 is moved by solenoid 90 to the left as seen in Fig. 1, or to the right as seen in Figs. 2, 3 and 15, plate 201 is rocked to close contacts 207 and thus energize solenoid 210 to release latch 55. This releases the levers 45 to the control of code bars 40. Upon return movement of the code bars, contacts 207 are opened and spring 214 restores the latch 55.

In their normal positions, toward the right as seen by an operator facing the machine and as shown in Fig. 1, the code bars 40 are so positioned that none of the operating levers 45 can be raised. This condition is shown in the lower part of Fig. 15 where spring 41 holds the bar 40f to the left with the notches thereon out of alignment with the bars 45. However, when any bar 40 is moved to the right under the influence of one of the solenoids 90 as described above, the notches therein come into alignment with such of the operating levers 45 as are affected by the particular code bar in question, so that unless these levers are restrained by projecting portions on other code bars they may be raised under the influence of the tension springs 56. For example, when the tape is advanced to present the code designation for the character "A," the bars 40a, 40c, and 40f are moved to the right as seen in Fig. 15 so that the first notch in each of these bars is directly over the first operating lever 45.

As viewed in the lower left corner of Fig. 15, this first lever 45, from the left of said figure, is notched opposite all the code bars which are not moved when the character to be operated by said lever is called for by the tape. In other words, the first or "A" lever 45, which is connected in a manner to be described presently to the "A" character key on the embossing machine, is notched opposite the code bars 40b, 40d, and 40e.

These bars are not moved when the code representation for the character A is sensed by the electrical contacts previously described, but inasmuch as the bar is cut away opposite these three code bars, they do not interfere with its rising when the other three code bars 40a, 40c, and 40f, which do have corresponding notches, are moved to operative position. Similarly, each of the other operating levers 45 is notched opposite every code bar which does not itself have a notch therein for such lever, that is, a notch which can be brought opposite the lever when operation thereof is called for by the tape. By means of this arrangement, the selective movement to the right as seen in Fig. 15, of one or more of the six code bars 40a to 40f will permit a selected one of the operating levers 45 to rise under the influence of the spring 56 as mentioned above.

Referring now to Fig. 4 it will be noted that the armor or sheath portion of a Bowden cable 101 is anchored in the base frame member 31 by a suitable connection indicated at 102. Within the connection 102, a vertical upstanding connection 103 is arranged for sliding movement and is connected at its upper end to the lower edge of a lever 45. It will be understood that one connection 103 and one Bowden cable is provided for each of the levers 45 with the exception of certain levers which operate through electrical contacts and solenoids as described hereinbelow. This connection attaches to the upper end of a Bowden cable 105, the other end of which is connected to one of the operating key levers such as is indicated at 24 in the embossing machine as shown in Fig. 1. By this arrangement whenever one of the levers 45 is permitted to rise to the dotted line position shown in Fig. 4, the Bowden cable 105 associated therewith pulls down the operating key lever of the embossing machine to cause a character to be embossed upon a plate or the like which has been positioned in operative relation to the embossing dies of the embossing machine (not shown). In addition to the character keys 24, other keys such as the shift key 25 and the space bar 26 may be operated under control of levers 45 but through special operating means which are required because of the force involved in operating these controls.

Figure 16:
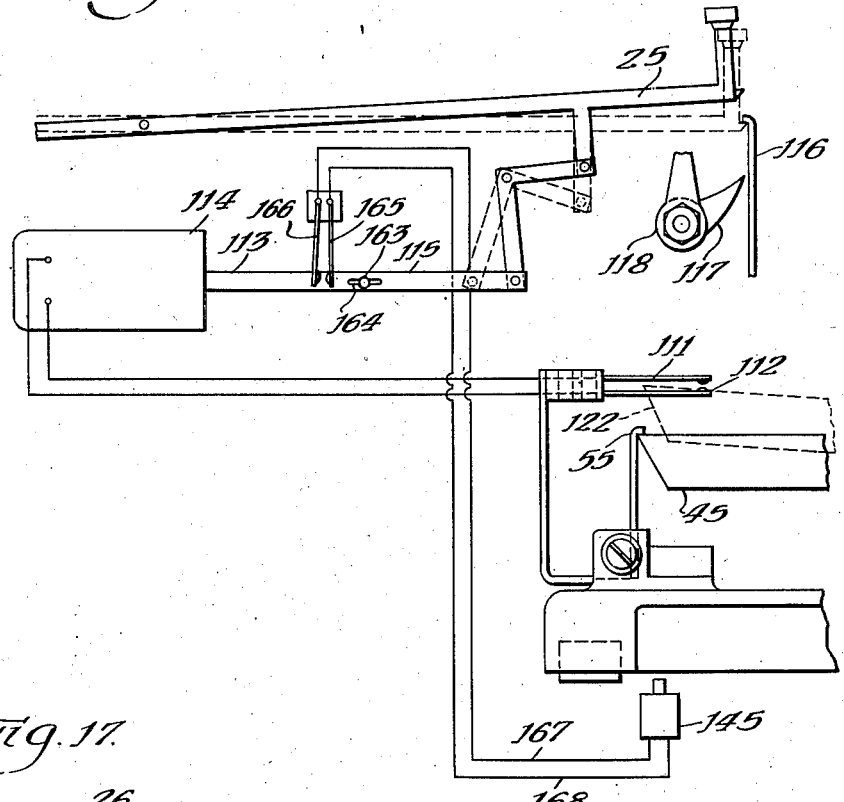
Fig. 16 is a detail view showing certain connections between the remote control mechanism and an embossing machine.

The arrangement just described permits manual operation of the keyboard of the embossing machine, Fig. 16, when desired, without necessitating the disconnection of the automatic mechanism which comprises the present invention.

As indicated above, certain of the operating elements, for example, the shift key and the space bar, may require too much power to be operated by the raising of levers 45 under the influence of the spring 56. For this reason, solenoids are preferably employed to operate the keys or control members which require greater power than can be applied through the linkages described above. In these cases the appropriate operating levers 45 are not directly attached to Bowden cables as 105, but instead they are utilized to close electrical contacts which, in each case, control a solenoid attached to the desired operating lever. Thus as shown in Fig. 4, a pair of electric contacts 111 and 112 may be closed by the raising of a bar 45 when the shift code is presented by the control tape T to the sensing mechanism. Contacts 111 and 112 complete a circuit to a solenoid 114, Fig. 16. As described more fully in the aforesaid Gruver application and as shown in Fig. 16, the plunger 113 of the solenoid 114 is mechanically attached to the shift key lever 25 as by a link 115. Since the shift key must be held down, as in a typewriter, during operation of the next character key, latch means 116 are provided for latching such shift key lever 25 in its lowered position until the next following code element in the tape has caused an operation of a character key. The shift lever is held by such a latch element only momentarily and means 117 are provided in the mechanism 118 which restores the operating keys of the embossing machine to their normal raised position for releasing the shift key lever after the next character key has been operated. In other words, initiation of a shift operation by a code element of the control tape T closes contacts 111 and 112 to energize solenoid 114 which pulls the shift lever 25 down. The shift lever is latched down permitting the lever 45 to be restored to its normal lowered position shown in full lines in Fig. 4, the shift mechanism remaining operative until after the next cycle where a character key 24 is depressed by operation of one of the Bowden cables 105 and as such next cycle is completed, restoration of key 24 to its raised position unlatches the shift key lever.

Operation of the space bar lever 26 also requires more power than can be obtained through the springs 56 and hence, another pair of contacts 119 and 120 are closed when the operating lever 45 which is intended to operate the spacing mechanism is permitted to rise to the dotted line position of Fig. 4. Closing of contacts 119 and 120 initiates operation of another solenoid 120A which through a bell crank 120B pivotally mounted at 120c to a suitable rigid support operates the space bar 26. See Fig. 17.

Other control keys of the keyboard, such as the tabulating key for example, may be operated in the same manner as the character keys by direct operation of a Bowden cable 105 connected to a lever 45.

It will be understood that, after any one of these operations is completed, it is necessary to restore the raised bar or lever 45 to its normal latched position under the latch member 55. This is accomplished by an eccentric cam portion 121 which is formed on the shaft 34 and extends across the full width of the bank of levers 45. The levers are permitted to rise after the eccentric 121 has been rotated to its uppermost position as shown in Fig. 4. At this time operation of the manual control element of the keyboard takes place as the solenoids 90 are operated through circuits established by contact of the sensing members 83 with the roller 75 through perforations P in the control tape T. Further rotation of the shaft 34 brings the eccentric sleeve 121 into contact with the upper edge of whichever bar 45 may be in the raised position and thus restores it to its normal horizontal position. The beveled end 122 of each lever 45 forces the latch plate 55 counter-clockwise as seen in Fig. 4 before engaging thereunder. This displacement of the latch plate 55 does not release other bars since they are also under the control of the eccentric as well as being held down by the code bars 40. Hence, at each cycle of the machine one lever 45, and only one such lever, is permitted to rise and it is restored to its normal horizontal position in line with the other bars before the cycle is completed.

As previously mentioned, the shaft 34 which controls the movement of all the other operating elements of the mechanism is operated cyclically. A one-revolution clutch is provided for controlling such operations, and this clutch is so controlled that a new operation is not initiated until the previous cycle, including operation of the embossing machine, has been substantially completed. This is necessary for the reason that the tape reading mechanism and the levers 45 which operate under control of the code bars 40 are all physically capable of operation at a much greater speed than the embossing machine is capable of operating. The embossing of sheet metal plates requires parts of substantial strength, and hence, parts having substantial mass, which necessarily limits their speed. Such parts cannot be operated at high speed, and it is necessary to limit the speed of operation of the remote control mechanism accordingly. This is accomplished in a manner now to be described.

Referring now to Figs. 12 and 13, it will be seen that a Bowden cable 131 is suitably anchored at 132 to the base plate 31. This Bowden cable has its other end connected to a restoring mechanism in the embossing machine which is effective to restore all of the operating keys 24 of the machine to their normal raised positions in a manner which is well-known in the art, and is described in the aforesaid patent to Duncan, as well as being mentioned in the aforesaid copending application filed by John H. Gruver. Whenever a cycle of operation of the embossing machine is completed, the restoring mechanims for the character keys 24 pushes the Bowden cable 131 to cause a slidable pin 133 mounted on the upper end thereof and slidable in a guide member 134 suitably secured to the base 31, to rock a latch lever 135 upwardly or counter-clockwise as seen in Fig. 12. This latch lever is pivotally mounted on a pin 136 which in turn is carried by an upstanding bracket 137 suitably secured to the base member 31. The opposite end of latch member 135 comprises a pawl 137 which engages a shoulder 138 on a disk member 139 suitably mounted on the shaft 34. A spring 140 tends to hold the latch pawl 137 engaged with shoulder 138.

The operation of any one of the keys or other control elements other than character keys and the tabulator key on the embossing machine, which is initiated by the release and lifting of bars 45 in the manner described hereinabove, is effective to initiate operation of a clutch release solenoid 145. This is accomplished in the following manner. Suitable contacts are arranged in connection with the various operating elements of the embossing machine, such as the means for feeding a plate, returning the carriage, or ejecting a plate, in such a manner that an electric circuit is established when any of these operations approaches completion. Closing any pair of such electrical contacts energizes the solenoid 145, the plunger 141 of which extends upwardly and, by means of a pivot pin 142, pivotally carries and supports a latch releasing member 143. The latch releasing lever 143 has a catch 144 thereon which is adapted to engage a pin 146 extending from the side face of the latch member 135, as best seen in Fig. 12, and such engagement is effected by a spring 152A. As the armature 141 moves downwardly, the releasing lever 143 rocks the clutch lever 135 to its released position, so as to allow the clutch to engage, and in continued downward movement of the armature 141 the tail 143A of the lever 143 strikes a stationary release pin 152B to thereby release the catch 144 from the pin 146. This permits the stop lever 135 to return toward its active position so as to be conditioned for releasing the clutch at the end of the cycle. When the solenoid 145 is de-energized, the upper cam surface on the catch 144 enables the catch to resume its engaged relation with respect to the pin 146.

The single revolution clutch through which the shaft 34 may be connected with the member 37 is of a known type and is generally similar to that described in my aforesaid copending application. It comprises the disk member 139 mounted freely on the shaft 34 and connected with an eccentric portion, not shown, by which a friction element carried by a radial arm 147 may be moved radially into or out of driving engagement with the inner surface of the member 37. Since arm 147 is keyed to shaft 34, this causes the shaft to rotate with drum member 37 as long as the frictional engagement is maintained.

The arm 147 bears a pin 148 and the disk member 139 bears a pin 149. A tension spring 150 tends to draw these pins toward each other, thereby causing the disk 139 to rotate with respect to the arm 147 and force the friction shoe thereon into driving engagement with drum 37. As long as the latch pawl 137 engages the shoulder 138, the disk is held against rotation, the spring 150 being somewhat extended by the light frictional drag between the arm 147 and the drum 37. As soon as the latch pawl 137 is released, the disk is drawn clockwise, as seen in Fig. 12, by spring 150 and this forces the shoe on arm 147 to firmly engage the drum member 37, thus driving the shaft 34 through one revolution. During most of its rotation, the nose of latch pawl 137 rides on the periphery of the disk 139, the action of the solenoid 145 being momentary only for a time sufficient to release the disk for rotation. As the disk 139 completes a revolution, a cam surface 151 thereon permits the catch pawl to rotate clockwise, as seen in Fig. 12, under the influence of its spring 140, so that the pawl will engage the shoulder 138 and stop further rotation of the disk at the end of a full revolution. As the disk is stopped, the shoe is withdrawn from driving engagement with the drum 37 which rotates continuously. A spring 152 in the solenoid 145 holds its plunger up when the solenoid is not energized.

By the means just described, the operating and control mechanism which comprises the present invention is driven in cycles to feed the control tape T one step at a time. At each step, the sensing contacts 83 determine the presence of one or more perforations at selected points in the tape and electrical circuits are established to move selected solenoids 90 and thus permit one of the operating levers 45 to rise and initiate the next operation of the embossing machine. As mentioned above, and as more fully described in the aforesaid copending application of John H. Gruver, another operation of the control mechanism of the present invention is not initiated until the embossing machine operation cycle has been substantially completed.

A specific example of operation is as follows: Assuming that a tape T has been prepared for feeding through the sensing mechanism and that the remote control mechanism of the present invention has been connected to the embossing machine, the combined apparatus is in condition to begin embossing a printing plate. The tape T is normally provided with a few advance feed perforations FP which can be placed over the feed pins 76 on the feed roller 75, Figs. 8 to 10. The reel 64 of tape T is placed on the spindle 63 and locked thereon by mechanism 65, Fig. 4. The end of the tape is led under the guide 67 and placed over the roller 75 to engage the perforations FP with the pins 76. The feed roller 75 is provided with a knurled knob 161, Fig. 6, which the operator turns manually to advance the end of the tape into contact with the sensing members 83 which, by reason of inherent resiliency, are in frictional contact with the feed roller 75 when no tape is in place. The pawl and ratchet mechanism which drive the feed roller step by step as the drive shaft 34 is operated, and the toothed wheel 77 and its positioning pawl 78 permit manual rotation of the feed roller in the feeding direction.

Electric current is turned on, by an appropriate switch, not shown, to energize the motor driving member 37 and to energize other elements including contacts 83 and their respective solenoids 90 when perforations in tape T are sensed. As the feed roller is rotated manually, the first set of control perforations is sensed by the contacts 83 and appropriate solenoids 90 move their respective code bars 40 to permit one of the operating levers 45 to rise. For example the bar which controls "plate feed" in the embossing machine may be first to be released. Referring to Figs. 14 and 15, this involves the shifting of code bars 40b and 40d, by their solenoids 90. As this occurs, the control key 21 is depressed through its Bowden cable connection with its bar or lever 45, and clutch mechanism 18 of the embossing machine operates a plate feeder to advance a plate into embossing position. As this operation is completed, as more fully described in the aforesaid Gruver application, an electric circuit is established to the solenoid 145 which trips the remote control mechanism of the present invention in the manner described above, for a new cycle. The machine is now in full automatic operation.

The next cycle of the combined machines may be to operate shift mechanism so that the first letter embossed will be a capital. Referring to Figs. 14 and 15, this involves shifting only the code bar 40f so that the lever 45 which operates to close contacts 111 and 112, Fig. 4, will energize the solenoid 114, Fig. 16. The solenoid 114 draws its plunger 113 inwardly, rocking the shift lever 25 downwardly to the dotted line position shown in Fig. 16 where it is latched by pivoted latch 116. As the plunger draws link 115 to the left, as seen in Fig. 16, a projecting stud 163, adjustably positioned in a slot 164 in said link, operates to close a pair of electrical contacts 165 and 166. These contacts close a circuit to the solenoid 145, through leads 167 and 168, and solenoid 145 trips the one-revolution clutch of the remote control mechanism for another cycle, in the manner described above.

Normally the next cycle will involve the operation of a character key 24 on the embossing machine (Fig. 1). The code bars 40 are moved as before to release the appropriate lever 45 which operates through its Bowden cable connection to operate the appropriate character key 24. As this operation is concluded, a Bowden cable 131 (Fig. 4) extending from the key restoring mechanism of the embossing machine (not shown) to the pin 133 which operates the latch lever 135, Fig. 12, trips the remote control mechanism for another operation. At the same time a part of the restoring mechanism 118 acts through a member 117, Fig. 16, to release the latch 116 which held down the shift lever during operation of the first character key. This restoring mechanism operates within the embossing machine in a manner well known in the art, to restore the various keys to their normal raised positions at the end of each embossing operation. Hence the remote control mechanism is not tripped until the embossing machine has completed or substantially completed its cycle.

The next operation called for by the control tape may be the embossing of a lower case character which is accomplished in the same manner as the embossing of a capital letter, just described, except that the shift lever 25 has been previously released to its normal raised position. At the completion of this operation, the one-revolution clutch is again tripped by the key restoring mechanism of the embossing machine through Bowden cable 131 and the operation is repeated.

Figure 17:
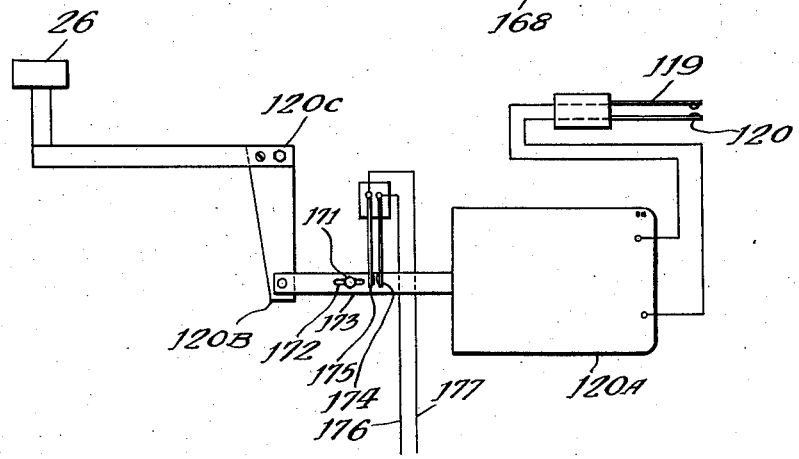
Fig. 17 is another detail view of additional connecting elements.

When the code on the tape calls for actuation of the space bar, one of the levers 45 closes another pair of contacts 119, 120, Fig. 17. These establish a closed electrical circuit which energizes solenoid 120A, drawing the arm 120B to the right as seen in Fig. 17, to depress the space bar. A stud 171 adjustably mounted in a slot 172 of the extended solenoid plunger 173 closes a pair of electrical contacts 174 and 175 as the space bar is fully depressed. This operation completes an electric circuit through a pair of conductors which lead to the solenoid 145, to trip the remote control mechanism for the next cycle.

At the end of a complete line of embossing it is normally desired to return the plate to initial position with respect to the embossing dies and to shift it by a line space to emboss a second line of characters thereon. This is accomplished by operating key lever 22, Fig. 1, through a Bowden cable 105 connected to an appropriate lever 45. As described more fully in the aforesaid Gruver application, the operation of key lever 22 engages clutch mechanism 19 to return the carriage 180, Fig. 1, to the left, where it is shown in said figure, and to space it inwardly, or to the rear as seen in Fig. 1, by an amount equal to one line space. In the construction shown, the line spacing function is combined with the function of returning the carriage 180, so a separate operation need not be provided for line spacing. For some purposes, however, line spacing under separate control is desirable and in such cases an additional key lever and clutch mechanism, with appropriate operating mechanism in the embossing machine, may be utilized and separately controlled. As in the operations described above, completion of the carriage return and line spacing operation energizes solenoid 145 for another cycle to feed tape T another step, suitable means for accomplishing this being shown and described in said Gruver application.

Referring to Fig. 14, a code representation is shown for controlling the tabulating key on an embossing machine. If the second or subsequent line, as for example, of an address on a printing plate is to be indented, the tabulating key is operated through a lever 45 and its Bowden cable connection 105, in the same manner as the character keys 24 are operated. For some types of operation, use of the tabulating key is not necessary.

After a plate has been completely embossed, it is necessary to eject the plate from the carriage before a new one can be fed thereinto. Hence means are provided including a bar 45 and its Bowden cable connection 105, for operating the key lever 23. This causes a clutch mechanism 20 to engage and place in operation mechanism, described in detail in the aforesaid copending application of John H. Gruver, to withdraw a plate to the right, as seen in Fig. 1, from the carriage 180, to carry it to a discharge chute 181, and to process it, if desired, through smoothing rollers (not shown) for pressing the embossed printing characters into a uniform plane and to smooth out any roughness therein. Such means comprise no part of the present invention, being known in the art.

After completion of one plate, another is fed into the embossing carriage and the process is repeated without interruption as long as the tape T continues to be fed step by step through the remote control mechanism.

The present invention has been described in connection with a particular type of embossing machine used for a particular purpose, but it will be apparent that its use is not intended to be limited thereto. Other and obvious applications to other types of apparatus and for other functions will suggest themselves to those skilled in the art.

Also it will be noted that the present invention accomplishes its intended objects, some of which have been specifically referred to hereinbefore and other of which will be apparent from the foregoing description taken in conjunction with the accompanying drawings.

I claim:

1. In a mechanism for automatically governing and operating a key controlled embossing machine, a mounting frame adapted to be rigidly associated with such an embossing machine, sensing means mounted on said frame affording a sensing station through which a control tape bearing coded data representing perforations may be passed, tape feed means mounted on said frame adjacent said sensing station and operable to impart step-by-step advancing movements to such a tape past said sensing station, a plurality of control levers pivoted on a common axis adjacent one end and individually spring urged from normal positions to control positions, a common restoring cam for all of said levers mounted for rotation on an axis parallel to the pivotal axis of said levers and operable through a one-revolution cycle to release said levers for setting movement to said control positions thereof and to then restore to normal position any lever that has so moved, a one-revolution clutch operable when engaged to drive said restoring cam through its cycle, means operatively connected to said one-revolution clutch so as to be driven concurrently with said restoring cam in its operating cycle to actuate said tape feed means, a plurality of permutation bars spring urged toward normal positions and longitudinally shiftable to set positions disposed parallel to said axes and effective to selectively control setting movement of said levers, operating means controlled by said sensing means for shifting said bars selectively to set positions, and a plurality of control means adapted to be operatively associated with the keys of such an embossing machine and mounted on said frame for actuation selectively by the other ends of said levers upon movement of the related levers to said control positions thereof.

2. In a mechanism for automatically governing and operating a key controlled embossing machine, a mounting frame adapted to be rigidly associated with such an embossing machine, sensing means mounted on said frame affording a sensing station through which a control tape bearing coded data representing perforations may be passed, tape feed means mounted on said frame adjacent said sensing station and operable to impart step-by-step advancing movements to such a tape past said sensing station, a plurality of control levers pivoted on a common axis adjacent one end and individually spring urged from normal positions to control positions, a common restoring cam for all of said levers mounted for rotation on an axis parallel to the pivotal axis of said levers and operable through a one-revolution cycle to release said levers for setting movement to said control positions thereof and to then restore to normal position any lever that has so moved, a one-revolution clutch operable when engaged to drive said restoring cam through its cycle, means operatively connected to said one-revolution clutch so as to be driven concurrently with said restoring cam in its operating cycle to actuate said tape feed means, a plurality of permutation bars spring urged toward normal positions and longitudinally shiftable to set positions disposed parallel to said axes and effective to selectively control setting movement of said levers, operating means governed by said sensing means for shifting said bars selectively to set positions, a plurality of control means adapted to be operatively associated with the keys of such an embossing machine and mounted on said frame for actuation selectively by the other ends of said levers upon movement of the related levers to said control positions, mechanically operable means for initiating a cycle of said clutch and including a Bowden cable adapted to be associated with and operated by an element of such an embossing machine, and electrically operable means for initiating a cycle of said clutch and having an energizing circuit adapted for control by other elements of such an embossing machine.

3. In a mechanism for automatically governing and operating a key controlled embossing machine that has power operated plate handling mechanism for the printing plates to be embossed by the machine, a mounting frame adapted to be rigidly associated with such an embossing machine, sensing means mounted on said frame affording a sensing station through which a control tape bearing coded data representing perforations may be passed, tape feed means mounted on said frame adjacent said sensing station and operable to impart step-by-step advancing movements to such a tape past said sensing station, a plurality of control levers pivoted on a common axis adjacent one end and individually spring urged from normal positions to control positions, a common restoring cam for all of said levers mounted for rotation on an axis parallel to the pivotal axis of said levers and operable through a one-revolution cycle to release said levers for setting movement to said control positions thereof and to then restore to normal position any lever that has so moved, a one-revolution clutch operable when engaged to drive said restoring cam through its cycle, means operatively connected to said one-revolution clutch so as to be driven concurrently with said restoring cam in its operating cycle to actuate said tape feed means, a plurality of permutation bars spring urged toward normal positions and longitudinally shiftable to set positions disposed parallel to said axes and effective to selectively control setting movement of said levers, operating means controlled by said sensing means for shifting said bars selectively to set positions, a plurality of Bowden cables the sheaths of which are anchored at one end on said frame and the cables of which are connected at one end to the other ends of said levers and are adapted to be operatively associated with certain of the keys of such an embossing machine and with the power means of said plate handling mechanism, respectively, switch means mounted on said frame for closure by the other ends of said levers upon movement of the related levers to set control positions thereof, and a Bowden cable and an electrically operated means mounted on said frame and adapted selectively to initiate a cycle of operation of said clutch, said last mentioned Bowden cable being adapted for operative association with an element of said machine for actuation at the end of each embossing cycle, and said electrically operated means being adapted for association with the plate handling mechanism for control thereby.

CLIFTON CHISHOLM.

REFERENCES CITED

The following references are of record in the file of this patent:

UNITED STATES PATENTS

| Number | Name | Date |
| --- | --- | --- |
| 1,292,944 | Wright | Jan. 28, 1919 |
| 1,606,126 | Houston | Nov. 9, 1926 |
| 1,930,058 | McCain | Oct. 10, 1932 |
| 1,975,791 | Hopkins | Oct. 9, 1934 |
| 2,247,275 | Buckley | June 24, 1941 |
| 2,250,857 | Doty | July 29, 1941 |
| 2,255,011 | Lake et al. | Sept. 2, 1941 |
| 2,346,819 | Buckley | Apr. 18, 1944 |
| 2,378,371 | Thostrup | June 12, 1945 |

FOREIGN PATENTS

| Number | Country | Date |
| --- | --- | --- |
| 399,586 | Great Britain | 1933 |